(12) United States Patent
Kim

(10) Patent No.: US 6,395,366 B1
(45) Date of Patent: May 28, 2002

(54) PHASE CHANGE OPTICAL DISC

(75) Inventor: Seong-sue Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 35 days.

(21) Appl. No.: 09/717,383

(22) Filed: Nov. 22, 2000

(30) Foreign Application Priority Data

Nov. 24, 1999 (KR) .............................. 99-52388

(51) Int. Cl.$^7$ ................................. B32B 3/02
(52) U.S. Cl. ................. 428/64.1; 428/64.5; 428/64.6; 430/270.13
(58) Field of Search ................. 428/64.1, 64.4, 428/64.5, 64.6, 913; 430/270.13, 495.1, 945; 369/283, 288

(56) References Cited

U.S. PATENT DOCUMENTS 5,882,758 A   3/1999 Terada et al. .............. 428/64.1
5,888,680 A * 3/1999 Ohbayashi ................... 430/19
6,333,913 B1 * 12/2001 Yoshinari .................... 369/283

FOREIGN PATENT DOCUMENTS

| EP | 0 541 376 A1 | 5/1993 |
| EP | 0 683 485 A1 | 11/1995 |
| EP | 0 810 591 A1 | 12/1997 |
| EP | 0 874 361 A2 | 10/1998 |

* cited by examiner

Primary Examiner—Elizabeth Evans Mulvaney
(74) Attorney, Agent, or Firm—Staas & Halsey LLP

(57) ABSTRACT

A phase change optical disc having a substrate and a first dielectric layer formed on the substrate. A recording layer is formed on the first dielectric layer and is convertible into one of an amorphous state and a crystal state according to the power of an incident beam. A second dielectric layer is formed on the recording layer. A reflective layer is formed on the second dielectric layer. The first dielectric layer is formed of a material having a refractive index of 2.7 or more with respect to the incident beam.

23 Claims, 2 Drawing Sheets

PHASE CHANGE OPTICAL DISC

CROSS REFERENCE TO RELATED APPLICATIONS

This application claims the benefit of Korean Application No. 99-52388, filed Nov. 24, 2000, in the Korean Patent Office, the disclosure of which is incorporated herein by reference.

BACKGROUND OF THE INVENTION

1. Field of the Invention

The present invention relates to a phase change optical disc having a recoding layer that changes phases according to an incident beam, and more particularly, to a phase change optical disc in which the structure of a dielectric layer disposed between a substrate and a recoding layer is improved.

2. Description of the Related Art

Phase change optical discs are widely known as optical discs which enable recording/reproduction of information by using an optical feature in which a portion of the recording layer which receives an incident laser beam is converted to a crystal state or an amorphous state according to a power of the incident laser beam.

FIG. 1 shows a conventional phase change optical disc. The phase change optical disc 10 includes a substrate 11, formed of a transparent material such as polycarbonate, a first dielectric layer 12, a recording layer 13, a second dielectric layer 14, a reflective layer 15 and a protective layer 16 which are formed on the substrate 11 in order.

The first and second dielectric layers 12 and 14 are layers which protect the substrate 11 and the reflective layer 15 where the temperature of the recording layer 13 is quickly changed by an incident laser beam input to the substrate 11 in a direction indicated by an arrow A. The first and second dielectric layers 12 and 14 are formed of $ZnS-SiO_2$, a material having a superior thermal resistance feature. The reflective layer 15 is formed of a material having a superior reflectance such as aluminum (Al), to reflect an incident beam. The protective layer 16 is formed of an ultraviolet cure resin layer and the protective layer 16 protects the first and second dielectric layers 12 and 14, the recording layer 13 and the substrate 11. The recording layer 13 is formed of a material such as an Sb—Te—In—Se based compound and the phase of a portion to which a laser beam is emitted may be changed according to the power of the incident laser beam. For example, during recording, a high power laser beam is emitted to the recording layer 13. Accordingly, the portion of the recording layer 13 to which the laser beam is emitted melts and then is cooled to be converted to an amorphous state, forming an information mark. The information mark in an amorphous state and a neighboring portion in a crystal state are different in optical reflectance so that information is recorded/reproduced due to the difference in the optical reflectance. For erasing recorded information, a laser beam having a power of about ⅓–½ of the power which is used for recording is emitted. The information mark portion is heated by the laser beam to a temperature higher than a crystallization temperature and simultaneously lower than a melting temperature, and then the information mark portion is cooled down. Accordingly, the information mark in an amorphous state is crystallized again so that the information is erased.

To obtain a stable reproduction signal, the difference between the reflectance $R_c$ of the crystal recording state and the reflectance $R_a$ of the amorphous recording state, that is, $R_c-R_a$, is preferably 10% or more. Also, where overwrite information is recorded on a surface on which information has already been written, an error in a signal can be reduced only where an information mark having a desired size is recorded regardless of the state of the recording layer 13. Accordingly, the ratio between the optical absorptivity AC of the crystal recording state with respect to the optical absorptivity Aa of the amorphous recording state, that is, the optical absorptivity ratio, $A_c/A_a$, should be at least 1.2.

For the phase change optical disc, to increase the recording density by decreasing the interval between tracks, a study of using a blue laser beam having a short wavelength less than 450 nm instead of near infrared rays or a red laser beam has recently been performed. Where a blue laser beam having a short wavelength is used, a diameter of an optical spot and an interval between tracks are reduced so that the recording density increases accordingly. Where the interval between tracks decreases, a cross-erase phenomenon in which an information mark recorded on a neighboring track is erased during recording is serious. The cross-erase phenomenon is reduced as the optical absorptivity ratio $A_c/A_a$ increases. Thus, to increase the recording density, the optical absorptivity ratio $A_c/A_a$ needs to be increased to a maximum degree.

However, in the above-described phase change optical disc, as it is well known, a light wave reflected by the first dielectric layer and a light wave reflected by the crystal recording state generate destructive interference. Accordingly, in the crystal recording state, the reflectance decreases and the optical absorptivity increases while, in the amorphous recording state, the reflectance increases and the optical absorptivity decreases. Thus, although a high optical absorptivity ratio can be maintained, it does not exceed 1.3.

SUMMARY OF THE INVENTION

To solve the above problems, it is an object of the present invention to provide a phase change optical disc in which the structure of the dielectric layer between the substrate and the recording layer is improved to increase the optical absorptivity ratio so that the cross-erase phenomenon is reduced.

Additional objects and advantages of the invention will be set forth in part in the description which follows, and, in part, will be obvious from the description, or may be learned by practice of the invention.

Accordingly, to achieve the above object, there is provided a phase change optical disc comprising a substrate, a first dielectric layer formed on the substrate, a recording layer formed on the first dielectric layer which recording layer is convertible into one of an amorphous state and a crystal state according to a power of an incident beam, a second dielectric layer formed on the recording layer, and a reflective layer formed on the second dielectric layer. In a phase change optical disc according to the present invention, the first dielectric layer is formed of a material having a refractive index of 2.7 or more with respect to the incident beam.

BRIEF DESCRIPTION OF THE DRAWINGS

The above and other objects and advantages of the present invention will become more apparent by describing in detail a preferred embodiment thereof with reference to the attached drawings in which.

DESCRIPTION OF THE PREFERRED EMBODIMENTS

Figure 1:
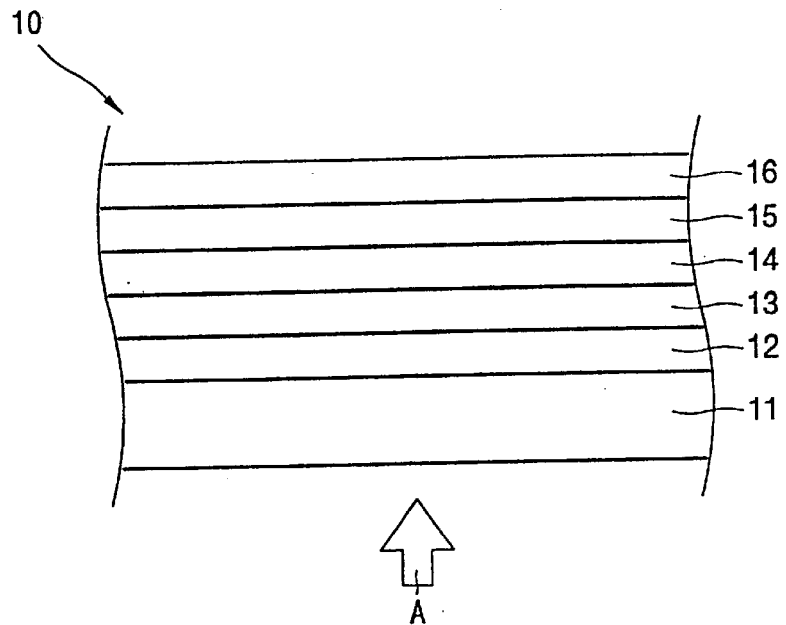
FIG. 1 is a schematic sectional view of the conventional phase change optical disc.

Reference will now be made in detail to the present preferred embodiments of the present invention, examples of which are illustrated in the accompanying drawings, wherein like reference numerals refer to like elements throughout.

Figure 2:
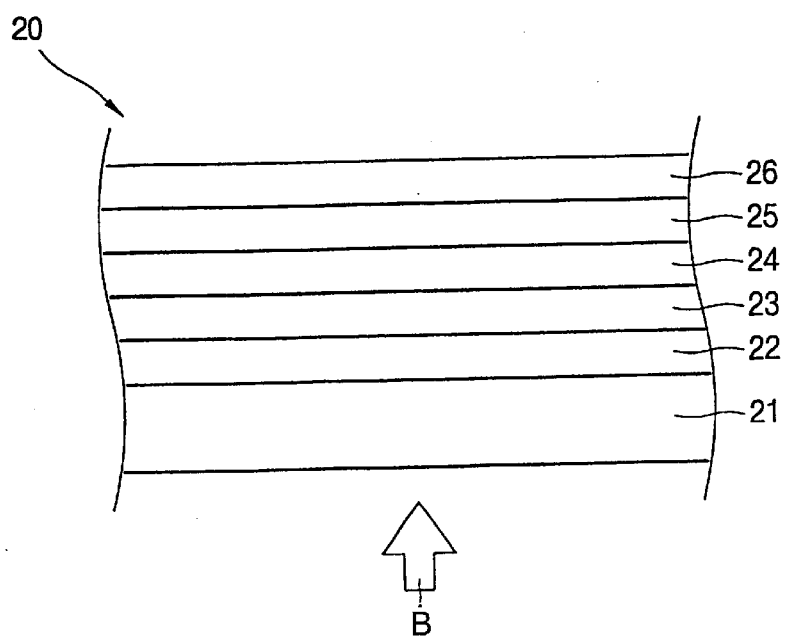
FIG. 2 is a schematic sectional view of a phase change optical disc according to an embodiment of the present invention.

Referring to FIG. 2, a phase change optical disc 20 according to an embodiment of the present invention includes a substrate 21, a first dielectric layer 22, a recording layer 23 formed on the first dielectric layer 22, a second dielectric layer 24 formed on the recording layer 23, a reflective layer 25 formed on the second dielectric layer 24, and a protective layer 26 formed on the reflective layer 25.

The functions of the layers of the phase change optical disc 20 shown in FIG. 2 are generally the same as the functions of the corresponding layers in the conventional phase change optical disc 10 shown in FIG. 1. That is, the substrate 21 is formed of a transparent material such as polycarbonate so that an incident beam can pass. The first and second dielectric layers 22 and 24 are provided to protect the substrate 21 and the reflective layer 25 from thermal impact where the temperature of the recording layer 23 is quickly changed by a laser beam incident in a direction indicated by an arrow B. The reflective layer 25 reflects the incident laser beam. In the recording layer 23, a phase of a portion of the recording layer 25 which receives the laser beam changes to an amorphous state from a crystal state or to a crystal state from an amorphous state according to a power of the incident laser beam.

In a phase change optical disc 20 according to the present invention, a first dielectric layer 22 is formed of a material having a refractive index of 2.7 or more with respect to an incident laser beam. For example, where the incident laser beam is a blue laser beam having a wavelength of 400 nm, $TiO_2$ having a refractive index of about 2.8 with respect to the blue laser beam is used as a material of the first dielectric layer 22. Alternately, ZnO, $CeO_2$ and ZnS may be used as material for the first dielectric layer 22.

A recording layer 23 is formed of an Sb—Te—In—Se based compound such as $Sb_2Te_3$—$In_4Se_3$, as in the recording layer 13 of the conventional phase change optical disc 10. The second dielectric layer 24 is formed of ZnS—$SiO_2$. ZnS—$SiO_2$ has a refractive index of about 2.3, which is lower than the refractive index of the first dielectric layer 22, with respect to light having a wavelength of 400 nm. The reflective layer 25 is formed of a material having a superior reflectivity such as Al. The protective layer 26 is formed of an ultraviolet cure resin on the reflective layer 25 and protects the first and second dielectric layers 22 and 24 and the recording layer 23 together with the substrate 21.

Since the processes of recording and reproducing information on and from the phase change optical disc 20 according to the present invention are the same as those in the conventional phase change optical disc 10, detailed descriptions thereof will be omitted.

In the phase change optical disc 20 of the present embodiment, since the first dielectric layer 22 has a high refractive index of 2.7 or more with respect to an incident beam as described above, the amount of light reflected by the first dielectric layer 22 increases, compared to the conventional phase change optical disc 10 having the first dielectric layer 12 formed of a material having a lower refractive index of 2.4 or less with respect to an incident beam. Light waves reflected by the first dielectric layer 22 generate destructive interference with light waves reflected by the crystal recording state so that, in the crystal recording state, reflectance $R_c$ decreases and optical absorptivity $A_c$ increases and, in the amorphous recording state, reflectance $R_a$ increases and optical absorptivity $A_a$ decreases. In the phase change optical disc 20 according to the present invention, since the amount of light reflected by the first dielectric layer 22 increases as described above, the optical absorptivity $A_c$ of the crystal recording state is remarkably increased and the optical absorptivity $A_a$ of the amorphous recording state is remarkably lowered, compared to the conventional phase change optical disc. Thus, the phase change optical disc 20 according to the present invention has an optical absorptivity ratio $A_c/A_a$ higher than that of the conventional phase change optical disc 10.

Figure 3:
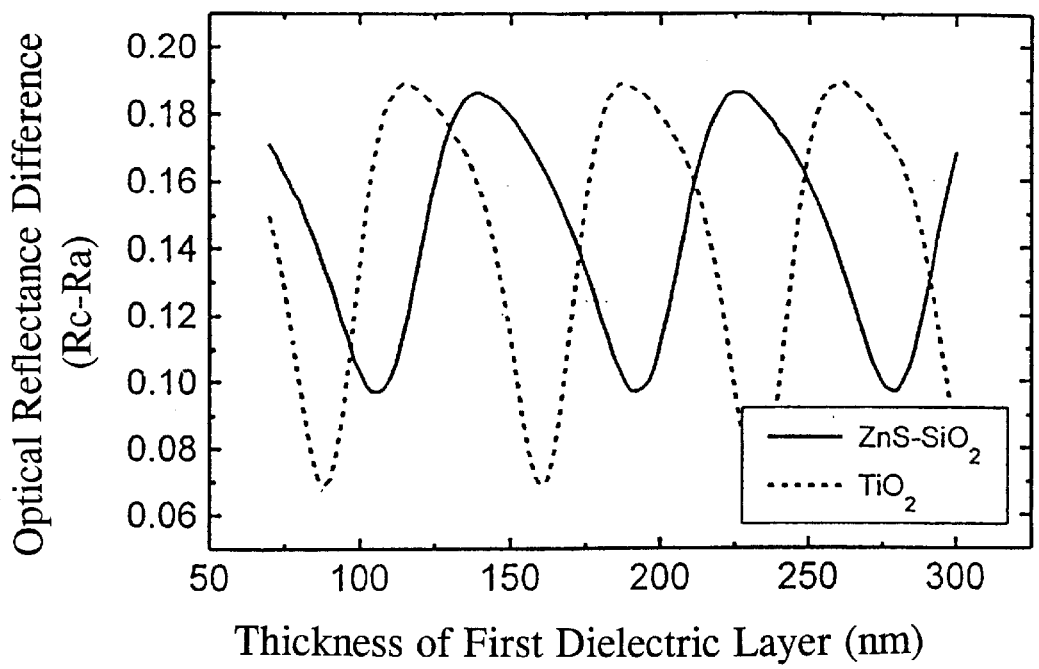
FIG. 3 is a graph showing optical reflectance difference as a function of first dielectric layer thickness of the phase change optical discs shown in FIGS. 1 and 2.
Figure 4:
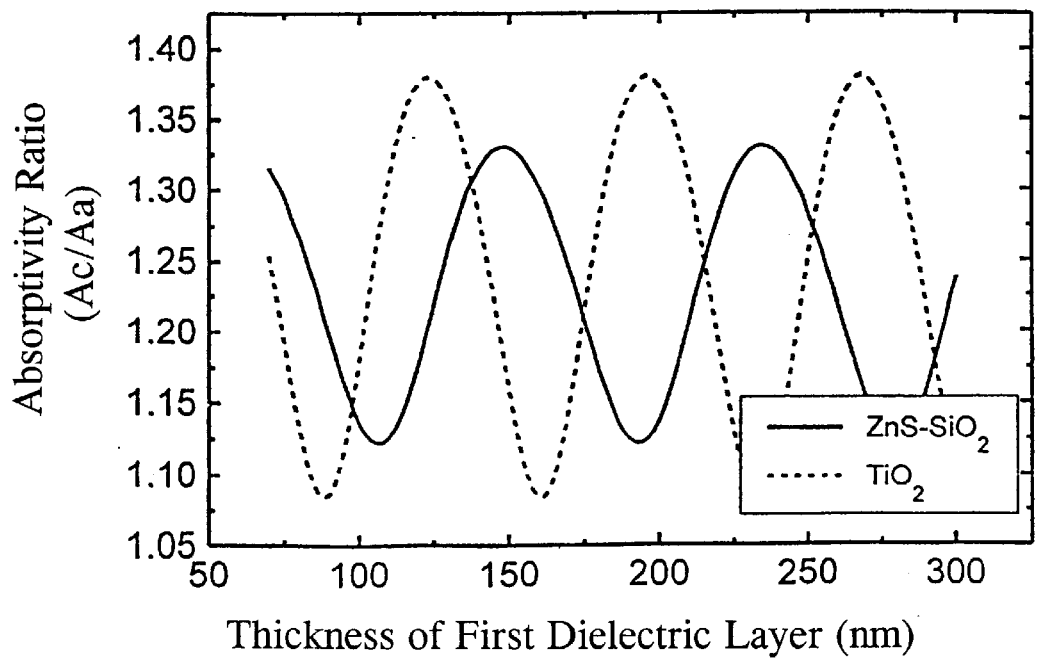
FIG. 4 is a graph showing optical absorptivity ratio as a function of first dielectric layer thickness of the phase change optical discs shown in FIGS. 1 and 2.

The results of comparisons between the difference in optical reflectance, $R_c-R_a$, and the optical absorptivity ratio, $A_c/A_a$ according to the change in thickness of the first dielectric layer with respect to the phase change optical disc 20 according to the present invention and the conventional phase change optical disc 10, are shown in FIGS. 3 and 4. In FIGS. 3 and 4, where a blue laser beam having a wavelength of 400 nm is incident as an incident beam for recording and reproduction, the phase change optical disc 20 according to the present invention, in which the first dielectric layer 22 is formed of $TiO_2$ having a refractive index of about 2.8 with respect to light having a wavelength of 400 nm, is shown by a dotted line. The conventional phase change optical disc 10, in which the first dielectric layer 12 is formed of ZnS—$SiO_2$ having a refractive index of about 2.3 with respect to light having a wavelength of 400 nm, is shown by a solid line.

As shown in FIG. 3, the optical reflectance difference, $R_c-R_a$, in the phase change optical disc according to the present invention, adopting $TiO_2$ as a material of the first dielectric layer 22, is lower than the minimum value of the optical reflectance difference in the conventional phase change optical disc adopting ZnS—$Si_2$, in the ranges of the thickness of the first dielectric layer being about 80–90 nm, 155–170 nm and so forth. In the other ranges, it is seen that there is no remarkable difference in optical reflectance from the conventional optical disc 10.

The optical absorptivity ratio $A_c/A_a$ in the phase change optical disc 20 according to the present invention adopting $TiO_2$ as a material of the first dielectric layer 22 is lower than the minimum value of the optical absorptivity ratio of the conventional phase change optical disc adopting ZnS—$SiO_2$ in the ranges of the thickness of the first dielectric layer being about 80–95 nm, 155–170 nm and so forth. However, the optical absorptivity ratio $A_c/A_a$ in the phase change optical disc according to the present invention is greater than the maximum value of the optical absorptivity ratio of the conventional phase change optical disc adopting ZnS—$SiO_2$ in the ranges of the thickness of the first dielectric layer being about 115–135 nm, 185–205 nm and so forth while the maximum value of the optical absorptivity ratio is about 1.38 in the ranges of the thickness of the first dielectric layer being about 125 nm, 195 nm and so forth.

Thus, where a blue laser beam having a wavelength of 400 nm is incident for recording/reproduction, if the first dielectric layer 22 is formed of $TiO_2$ to have a thickness of about 125 or 195 nm, as shown in FIG. 3, the optical reflectance difference, $R_c-R_a$, is within the ranges almost similar to the conventional phase change optical disc and the optical absorptivity ratio, $A_c/A_a$, has a high value of about 1.38.

Since the optical absorptivity ratio of the phase change optical disc according to the present invention is high, generation of a cross-erase phenomenon is naturally restricted. Thus, the interval between tracks of a recording layer can be reduced to 0.4 μm or less in the phase change optical disc according to the present invention. Accordingly, the recording density of the disc increases and the disc can be used as a high density DVD (HD DVD-RW) which can be repeatedly recorded.

Although the second dielectric layer is described to be formed of a $ZnS$—$SiO_2$ compound in the above present embodiment, another suitable material such as $SiN_x$ (where x is an integer) can be adopted. Also, although a laser beam is described as having a short wavelength of 400 nm in the above present embodiment, it is obvious that the technical spirit of the present invention may be applied to a case in which a laser beam having a wavelength of 450 nm or less or other wavelengths can be used.

As described above, in the phase change optical disc according to the present invention, since the dielectric layer disposed between the substrate and the recording layer is formed of a material having a refractive index of 2.7 or more with respect to an incident beam, the optical absorptivity ratio increases so that the generation of a cross-erase phenomenon is restricted and accordingly the recording density increases.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A phase change optical disc comprising:
   a substrate;
   a first dielectric layer formed on the substrate;
   a recording layer formed on the first dielectric layer and which converts into one of an amorphous state and a crystal state according to a power of an incident beam;
   a second dielectric layer formed on the recording layer; and
   a reflective layer formed on the second dielectric layer,
   wherein the first dielectric layer is formed of a material having a refractive index of 2.7 or more with respect to the incident beam.

2. The disc as claimed in claim 1, wherein the first dielectric layer is formed of a $TiO_2$ material.

3. The disc as claimed in claim 1, wherein the first dielectric is formed of a $ZnO$ material.

4. The disc as claimed in claim 1, wherein the first dielectric is formed of a $CeO_2$ material.

5. The disc as claimed in claim 1, wherein the first dielectric is formed of a $ZnS$ material.

6. The disc as claimed in claim 1, wherein the recording layer is formed of an Sb—Te—In—Se based compound.

7. The disc as claimed in claim 1, wherein the incident beam has a wavelength of 450 nm or less.

8. The disc as claimed in claim 1, wherein the second dielectric layer is formed of a $ZnS$—$SiO_2$ compound.

9. The disc as claimed in claim 1, wherein the second dielectric layer is formed of a material having a refractive index less than that of the first dielectric layer.

10. The disc as claimed in claim 1, wherein the recording layer has a first optical absorptivity in the crystal state and a second optical absorptivity in the amorphous state and a ratio of the first optical absorptivity to the second optical absorptivity ranges from about 1.08 to about 1.38 according to a thickness of the first dielectric layer.

11. The disc as claimed in claim 10, wherein the optical absorptivity ratio ranges from about 1.32 to about 1.38 according to a variation in the thickness of the first dielectric layer in the range of about 115 to 135 nm.

12. The disc as claimed in claim 11, wherein the optical absorptivity ratio has a peak at about 1.38 for the thickness of the first dielectric layer of about 125 nm.

13. The disc as claimed in claim 10, wherein the optical absorptivity ratio ranges from about 1.32 to about 1.38 according to a variation in the thickness of the first dielectric layer in the range of about 185 to 205 nm.

14. The disc as claimed in claim 13, wherein the optical absorptivity ratio has a peak at about 1.38 for the thickness of the first dielectric layer of about 195 nm.

15. The disc as claimed in claim 10, wherein the optical absorptivity ratio periodically ranges from the about 1.08 to the about 1.38 according to a variation in the thickness of the first dielectric layer.

16. The disc as claimed in claim 15, wherein the optical absorptivity ration has a peak at about 1.38 and another peak occurs about every 70 nm of thickness variation of the first dielectric layer.

17. The disc as claimed in claim 1, wherein an interval between tracks of the recording layer is less than or equal to about 0.4 μm.

18. The disc as claimed in claim 1, wherein the second dielectric layer is formed of an $SiN_x$ material, where x is an integer.

19. The disc as claimed in claim 9, wherein the refractive index of the second dielectric layer is about 2.4 or less.

20. A phase change optical disc comprising:
    a substrate;
    a first dielectric layer formed on the substrate;
    a recording layer formed on the first dielectric layer and which converts into one of an amorphous state and a crystal state according to a power of an incident beam;
    a second dielectric layer formed on the recording layer; and
    a reflective layer formed on the second dielectric layer,
    wherein the first dielectric layer is formed of one of a group consisting of $TiO_2$, $ZnO$, $CeO_2$ and $ZnS$.

21. A phase change optical disc comprising:
    a substrate;
    a first dielectric layer formed on the substrate;
    a recording layer formed on the first dielectric layer and which converts into one of an amorphous state and a crystal state according to a power of an incident beam; and
    wherein the first dielectric layer is formed of a material having a refractive index of 2.7 or more with respect to the incident beam.

22. The disc as claimed in claim 21, further comprising:
    a second dielectric layer formed on the recording layer wherein the second dielectric layer has a refractive index than the refractive index of the first dielectric layer.

23. The disc as claimed in claim 22, wherein the refractive index of the second dielectric layer is about 2.4 or less.

* * * * *

UNITED STATES PATENT AND TRADEMARK OFFICE
CERTIFICATE OF CORRECTION

PATENT NO.    : 6,395,366 B1
DATED         : May 28, 2002
INVENTOR(S)   : Seong-sue Kim It is certified that error appears in the above-identified patent and that said Letters Patent is hereby corrected as shown below:

Column 6,
Line 26, change "ration" to -- ratio --.
Line 62, add -- less -- between "index" and "than".

Signed and Sealed this

Seventeenth Day of December, 2002

JAMES E. ROGAN
*Director of the United States Patent and Trademark Office*